(12) United States Patent
Garcia et al.

(10) Patent No.: US 10,539,951 B2
(45) Date of Patent: Jan. 21, 2020

(54) PRINT DATA GENERATION SYSTEMS

(71) Applicant: Hewlett-Packard Development Company, L.P., Houston, TX (US)

(72) Inventors: Luis Garcia, Les Roquetes (ES); Miguel Angel Lopez, Barcelona (ES); David Ramirez Muela, Barcelona (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 138 days.

(21) Appl. No.: 15/761,049

(22) PCT Filed: Dec. 22, 2015

(86) PCT No.: PCT/EP2015/081035
§ 371 (c)(1),
(2) Date: Mar. 16, 2018

(87) PCT Pub. No.: WO2017/108108
PCT Pub. Date: Jun. 29, 2017

(65) Prior Publication Data
US 2018/0259939 A1 Sep. 13, 2018

(51) Int. Cl.
*G05B 19/4099* (2006.01)
*B33Y 50/02* (2015.01)
(Continued)

(52) U.S. Cl.
CPC ........ *G05B 19/4099* (2013.01); *B29C 64/357* (2017.08); *B29C 64/393* (2017.08);
(Continued)

(58) Field of Classification Search
None
See application file for complete search history.

(56) References Cited

U.S. PATENT DOCUMENTS 6,780,368 B2  8/2004  Liu et al.
2004/0239009 A1*  12/2004  Collins ............... B33Y 30/00
                                                        264/497
(Continued)

FOREIGN PATENT DOCUMENTS

EP        1486318 A2   12/2004

OTHER PUBLICATIONS

International Search Report and Written Opinion for international Application No. PCT/EP2015/081035 dated Oct. 19, 2016, 12 pages.

(Continued)

*Primary Examiner* — Kenneth M Lo
*Assistant Examiner* — Istiaque Ahmed
(74) *Attorney, Agent, or Firm* — HP Inc. Patent Department

(57) ABSTRACT

There is provided a method of generating print data for use by an additive manufacturing system to generate a plurality of 3D objects within a build chamber having a build surface. First spatial data defining a first 3D object and second spatial data defining a second 3D object is received. First print data is generated to cause the additive manufacturing system to manufacture the first 3D object at least partly from a first build material. Intermediate print data is generated to cause the additive manufacturing system to manufacture a partition comprising a 3D object configured to fill the build chamber in a plane parallel to the build surface. Second print data is generated to cause the additive manufacturing system to manufacture the second 3D object at least partly from a second build material.

15 Claims, 9 Drawing Sheets

(51) Int. Cl.
*B33Y 80/00* (2015.01)
*B29C 64/357* (2017.01)
*B29C 64/393* (2017.01)
*B33Y 70/00* (2015.01)
*B29L 31/00* (2006.01)

(52) U.S. Cl.
CPC .............. *B33Y 50/02* (2014.12); *B33Y 80/00* (2014.12); *B29L 2031/712* (2013.01); *B33Y 70/00* (2014.12); *G05B 2219/49023* (2013.01)

(56) References Cited

U.S. PATENT DOCUMENTS

| | | |
|---|---|---|
| 2011/0233808 A1 | 9/2011 | Davidson |
| 2011/0293771 A1* | 12/2011 | Oberhofer ............. B22F 3/1055 425/182 |
| 2014/0191439 A1 | 7/2014 | Davis |
| 2014/0324204 A1 | 10/2014 | Vidimce et al. |
| 2015/0142159 A1 | 5/2015 | Chang |
| 2016/0370791 A1* | 12/2016 | Revanur ................ B33Y 50/02 |

OTHER PUBLICATIONS

PolyJet Technology webpage, http://www.stratasys.com/3d-printers/technologies/polyjet-technology, 2 Pages, retrieved Oct. 26, 2015.
Chris Mills, GIZMODO, "This Box Turns Any 3D Printer Into a Multi-Color, Multi-Material Marvel," 5 pages, Apr. 21, 2015.

\* cited by examiner

PRINT DATA GENERATION SYSTEMS

BACKGROUND

Apparatus, including those commonly referred to as "3D printers", have been proposed as a potentially convenient way to produce three-dimensional objects. These apparatus typically receive a definition of the three-dimensional object in the form of an object model, or data derived from an object model. This object model (or data derived therefrom) is processed to form instructions, which control the apparatus to produce the object using at least one production material. Depending on the type of 3D printer, these production materials may comprise a combination of agents and powdered build materials, heated polymers and/or liquid solutions of production material. The processing of an object model (or data derived therefrom) may be performed on a layer-by-layer basis. It may be desired to produce a three-dimensional object with at least one property, such as color, mechanical and/or structural properties. The processing of the object model (or data derived therefrom) may vary based on the type of apparatus and/or the production technology being implemented. Generating objects in three-dimensions presents many challenges that are not present with two-dimensional print apparatus.

BRIEF DESCRIPTION OF THE DRAWINGS

Various features and advantages of the present disclosure will be apparent from the detailed description which follows, taken in conjunction with the accompanying drawings, which together illustrate, by way of example only, features of the present disclosure, and wherein.

Figure 1:
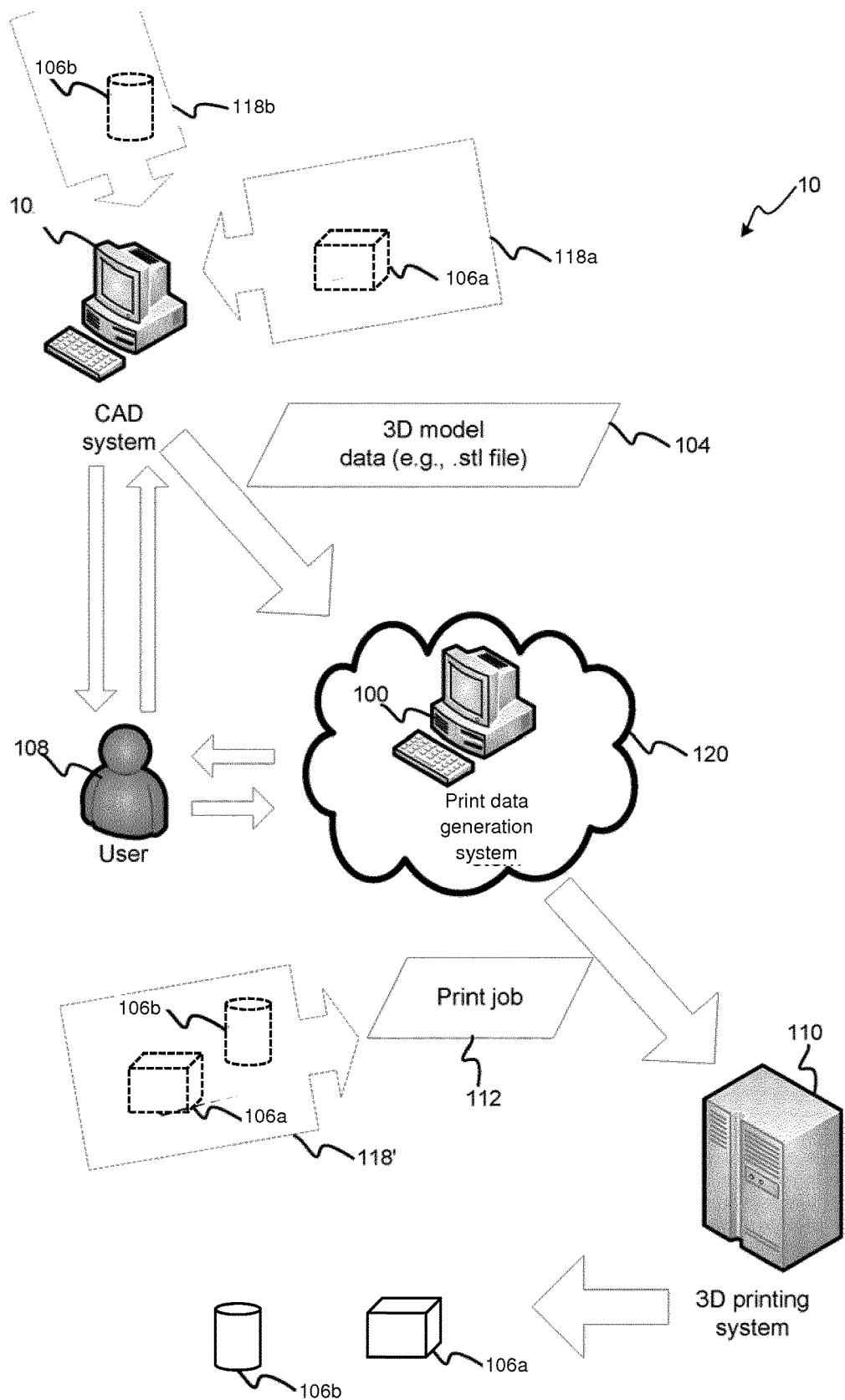
FIG. 1 shows an environment in which various examples can be implemented.

DETAILED DESCRIPTION 3D printing generally involves generating a 3D geometric representation of at least one objects to be printed (i.e., manufactured by a 3D printer). Such a 3D geometric representation may be referred to as an object model. An object model may be stored in a 3D data file using a specific file format. An object model may also define at least one material to be used to form the object. In some examples an object model may define a first material to be used to form a first portion of an object and a second material to be used to form a second portion of that object. The 3D data file may be processed to generate instructions that are processed by a 3D printing system for reproducing the object. There are a variety of solutions for processing information in a 3D data file as well as to enable a user to define how an object should be manufactured using a 3D printing system.

Sometimes a user may wish to generate multiple objects using the same 3D printing system. It is often the case that the set-up of the 3D printing system has to be changed between the generation of one object and the next, particularly if the different objects are to be generated using different materials. Changing the set-up of a 3D printing system is generally a time consuming manual process, which can involve changes to both the software and the hardware of the 3D printing system. For example, thermal settings are material dependent (i.e. melting temperature, crystallization temperature, shrinkage compensation factor, etc.). Settings relating to the processing pipeline (e.g. minimum feature size, minimum gap between objects, etc.) and settings relating to the printmode (e.g. number of passes, agent dosages, annealing times, etc.) may also be material dependent.

Thus, in 3D printing there is a challenge to provide an improved way of printing a first object using a first material and subsequently printing a second object using a second, different material. This is a particular challenge when the first material is associated with a different set of operating parameters of a 3D printer to the second material.

Certain examples described herein enable a 3D printing system to automatically generate a series of different objects, each of which may be generated using a different build material, without any input from a user during the generation.

More specifically, examples described herein facilitate creating print data for efficiently manufacturing multiple objects from different build materials using a 3D printing system, and the automatic manufacturing of multiple objects from different build materials, using the print data. The print data may be processed by a 3D processing system as a single print job resulting in the generation of multiple objects, each of which may be formed from a different build material. Furthermore, the examples may facilitate the avoidance of contamination between different build materials used in the generation of the multiple objects, and/or the recycling of unsolidified build material used in the generation of the multiple objects.

As used herein, an object refers to a 3D object to be individually built, or actually built, by a 3D printing system. An object, as referred herein, is built by successively adding layers so as to form an integral piece. A 3D model may include a polygon mesh defining an object. A polygon mesh refers to a collection of vertices, edges, and faces defining the shape of a polyhedral object in a 3D model. The faces may be formed as polygons such as, but not limited to, triangles. An object may include void spaces embedded in the object body.

As used herein, a print setting refers to a parameter, or set of parameters, that defines how an object is to be generated by a 3D printing system. The print setting may include a parameter set corresponding to at least one physical property of the object such as, but not limited to, material. The print setting may be user selected. Further properties that may be user selected for a specific object portion include density, color, roughness, or imperviousness.

FIG. 1 is a schematic diagram of an environment 10 in which various examples may be implemented. In environment 10, a print data generation system 100 is communicatively coupled to a source 102 of 3D model data 104, for receiving 3D spatial data relating to at least one object to be generated. In the illustrated example the source of 3D model data is a computer aided design (CAD) system 102. 3D model data 104 is associated with a 3D model 118*a* that includes a first object 106*a* to be generated. In some examples 3D model data 104 may define one or several build materials to be used to form the first object 106*a*. In some examples 3D model data 104 may define a first build material to be used to form a first portion of the first object 106*a*, and a second build material to be used to form a second portion of the first object 106*a*. 3D model 118*a* may include more than one object to be generated by a 3D printing system. 3D model data 104 is also associated with a 3D model 118*b* that includes a second object 106*b* to be generated. In some examples 3D model data 104 may define one or several build materials to be used to form the second object 106*b*. In some examples 3D model data 104 may define a first build material to be used to form a first portion of the second object 106*b*, and a second build material to be used to form a second portion of the second object 106*b*. 3D model 118*b* may include more than one object to be generated. 3D model data 104 may be associated with at least one further 3D model (not shown) in addition to the 3D models 118*a* and 118*b*.

In some examples print data generation system 100 can be accessed by a user 108 for, e.g., selecting objects to be included in a given print job, selecting build materials for objects to be included in a given print job, and/or selecting other settings in respect of objects to be included in a given print job. Print data generation system 100 is communicatively coupled to a 3D printing system 110 for generating object 106*a* and object 106*b* according to the print data generated by the print data generation system 100. More specifically, print data generation system 100 may generate a print job 112 for printing object 106*a* and object 106*b*. Print job 112 includes print data to cause the 3D printing system 110 to generate object 106*a* and object 106*b*. The print data in print job 112 may take into account the build material and any other print settings specifically selected (e.g. by the user 108) for object 106*a* and for object 106*b*. Print data generation system 100, CAD system 102, and 3D printing system 110 may be connected via a link (not shown in this Figure; the link may be analogous to link 524 shown in FIG. 5).

Print data generation system 100 represents, generally, any computing device or combination of computing devices configured to generate print data from 3D model data (and, in some examples, user inputted data, such as data indicating at least one selected build material, and/or data indicating other selected print settings). In some examples print data generation system 100 may operate a GUI to facilitate user selection of an object, a build material or other print setting for an object. The GUI may include graphical elements such as windows, menus, buttons, dialogs or the like configured to allow a user to specifically select or control at least one aspect of a print job, e.g. an object to be included in the print job, a build material to be used to manufacture a given object, and/or a print setting for a given object. User 108 may interact with print data generation system 100 directly or through a computer terminal communicatively coupled thereto (e.g. the computer terminal may connected through the internet to print data generation system 100).

Previously, 3D model 118*a* and 3D model 118*b* may have been created using CAD system 102 (or any other suitable system, which might be implemented in print data generation system 100), as further detailed below. In the illustrated example, the loaded 3D models 118*a* and 118*b* would be described by 3D model data 104, which is received by print data generation system 100. In some examples print data generation system 100 may render the 3D model in a GUI, to assist the user 108 in identifying a given object which they wish to select to be included in a print job, and/or for which they wish to select a build material or other print setting.

Print data generation system 100 may be further configured to cause 3D printing system 110 to generate objects 106*a* and 106*b*. In some examples print data generation system 100 may be configured to cause 3D printing system 110 to generate objects 106*a* and 106*b* using build material(s) selected by the user 108. In some examples print data generation system 100 may be configured to cause 3D printing system 110 to generate objects 106*a* and 106*b* using print setting(s) selected by the user 108. In some examples print data generation system 100 may run a printing application (or a plug-in) that accepts as input a 3D model 118'. The 3D model 118' may include print settings (e.g. specifically selected build materials and/or other settings for objects associated with the 3D model 118'). The 3D model 118' may comprise multiple 3D models (e.g. the 3D model 118*a* and the 3D model 118*b*). The 3D model 118' may be stored in a suitably formatted file or in a plurality of inter-referenced files (e.g., a file may contain spatial data of object 106*a*, another file may contain spatial data of object 106*b*, another file may contain print settings for object 106*a* and object 106*b*).

Print data generation system 100 may generate from the printable 3D object model 118' a print job (e.g. the print job 112) for manufacturing object 106*a* and object 106*b*. In some examples the print job may be generated based on at least one build material and/or print settings specifically selected by the user 108. In some cases, print data generation system 100 may transform object geometrical data into a valid printable 3D object model. Generally, how object geometrical data is transformed depends on the particular type of 3D printing system to print objects 106*a* and 106*b*.

In the depicted example, print data generation system 100 is shown deployed as part of a cloud computing system 120 (hereinafter referred to as cloud 120). A cloud computing system refers to a computing system including multiple pieces of hardware operatively coupled over a network so that they can perform a specific computing task. In the illustrated example cloud 120 includes a combination of physical hardware, software, and virtual hardware (not shown) configured to implement the functionality of print data generation system 100 as set forth herein. User 108 may interact with print data generation system 100 through a computer connected to internet (e.g., through CAD system 102 or another computing system). In other examples, user 108 may directly interact with print data generation system 100.

3D model data 104 may comprise a geometry definition data file. Such a geometry definition data file may be constructed using a variety of file formats. For example, such a geometry definition data file may correspond to a file format specifically designed for 3D printing such as stereolithography (.stl) file format, polygon file format (.ply), 3D Manufacturing Format (0.3 mf), or additive manufacturing file (.amf) format. CAD system 102 may send 3D model data 104 to print data generation system 100 by sending at least one geometry definition data file containing 3D model data 104.

In environment 10, print data generation system 100 and CAD system 102 are illustrated as independent computing systems. Print data generation system 100 and CAD system 102 may be combined in a single system responsible for generating and processing 3D model data 104 as illustrated above for enabling multiple objects, each of which may be to be generated using a different build material (and, in some examples, a different print setting) to be combined in a single print job. Moreover, the functionality illustrated above may be combined in a single application. For example, existing machine readable instructions for development of 3D models may provide services for the implementation of plug-in modules that enable further functionality of the application. A set of plug-in modules may be developed for one of the above referred to CAD applications, the set of plug-in implementing the functionality of print data generation system 100 illustrated above. In other examples, at least some of the functionality of print data generation system 100 described above may be implemented as a stand-alone application.

3D printing system 110 represents, generally, any system for additive manufacturing of an object using a power-based build material. 3D Printing system 110 may use a transformation of object 106a and object 106b as defined in 3D model 118' into relatively thin horizontal cross-sections (not shown) and then create successive layers until objects 106a and 106b are reproduced.

Figure 2:
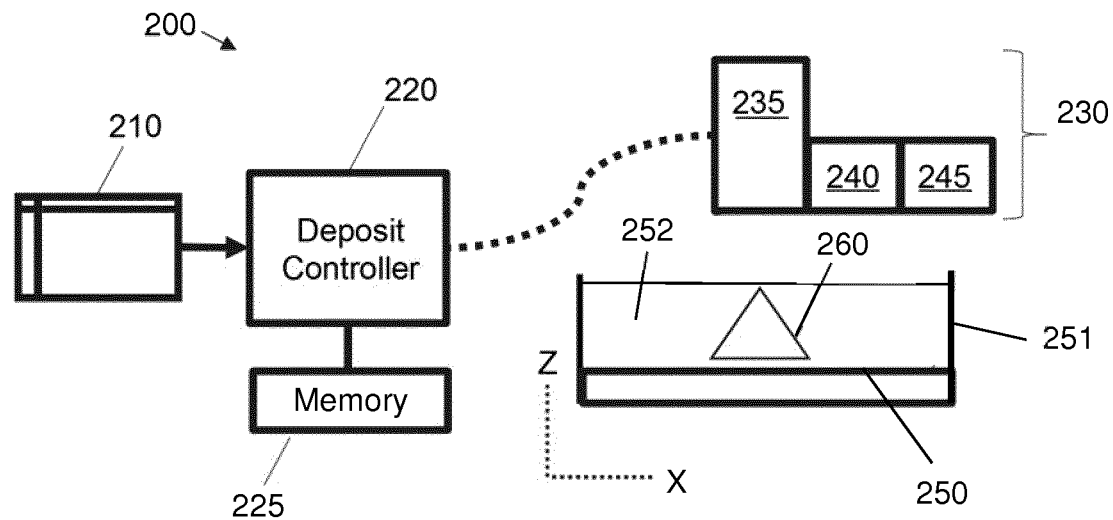
FIG. 2 is a schematic view of an example additive manufacturing system.

An example of an additive manufacturing system arranged to produce a 3D object using print data 210 generated by the print data generation system 100 will now be described with reference to FIG. 2. FIG. 2 shows an example of an apparatus 200 arranged to produce a 3D object 260. The apparatus 200 can receive print data 210 for the 3D object (e.g. from the print data generation system 100). In one case, at least one portion of the apparatus 200 may be implemented as executable code, stored on a non-transitory storage medium, that includes instructions, that when executed by at least one processor, causes the processor to perform the functionality of the at least one portion of the apparatus 200 described herein. Apparatus 200 is shown and described for better understanding of the presently described examples; other apparatus of a different form and/or using a different technology may alternatively be used with the structural volume coverage representations described herein.

In FIG. 2, the apparatus 200 comprises a deposit controller 220 and a memory 225. The deposit controller 220 may comprise at least one processor that forms part an embedded computing device, e.g. adapted for use in controlling an additive manufacturing system. Memory 225 may comprise volatile and/or non-volatile memory, e.g. a non-transitory storage medium, arranged to store computer program code, e.g. in the form of machine readable instructions and/or executable code that comprises instructions for at least one processor. The deposit controller 220 is communicatively coupled to aspects of the apparatus that are arranged to construct the 3D object. These comprise a deposit mechanism 230. The deposit mechanism 230 can deposit production materials to generate the 3D object. In the present case, the deposit mechanism comprises a build material supply mechanism 235 and an agent ejection mechanism 240, 245. In other cases the deposit mechanism 230 may comprise fewer or additional components, e.g. a build material supply mechanism may be provided separately from the agent ejection mechanism or omitted, or other components. In some examples the agent ejection mechanism is omitted, e.g. because those examples relate to additive manufacturing systems which do not use agents. In the schematic example of FIG. 2, the agent ejection mechanism 240, 245 comprise two components: a first component 240 for the supply of a first agent and a second component 245 for the supply of a second agent. Each of the first and the second agent may comprise, e.g., a coalescing agent, a coalescing modifier agent, a colorant, etc. The build material supply mechanism 235 can supply at least one build material layer upon which agents are deposited by the agent ejection mechanism 240, 245 to produce the 3D object 260. The build material comprises a powder, e.g. a polymer powder. In the present case, the combination of agent and build material, following a curing process, form part of the object. However, other implementations are possible, e.g. the build material may be selectively cured to form part of the object without use of an agent, e.g. by melting the build material with a laser. In the example of FIG. 2, the 3D object 260 is built layer by layer on a build surface 250. The build surface 250 forms the base of a build chamber 251. The build chamber 251 comprises a base and at least one side wall, which together define a partially enclosed build volume. The cross-section of the build volume, in a plane parallel to the build surface, is substantially constant over the height of the build chamber. In the illustrated example the build volume comprises a cuboid. The arrangement of the aspects and components shown in FIG. 2 are not limiting; the exact arrangement of each apparatus will vary according to the production technology that is implemented and the model of apparatus.

In the example of FIG. 2 the deposit controller 220 is configured to process and/or otherwise use the print data 210 to control at least one component of the deposit mechanism 230. The deposit controller 220 may control at least one of the build material supply mechanism 235 and the agent ejection mechanism 240, 245. For example, the print data 210 (or instructions comprised therein) may be used by the deposit controller 220 to control nozzles within the agent ejection mechanism. In one implementation the apparatus 200 may be arranged to use a coalescing agent and a coalescing modifier agent that are respectively supplied by the components of the agent ejection mechanism 240, 245. These agents allow a 3D object to have varying material properties. Generated objects may be constructed by depositing at least the coalescing agent and the coalescing modifier agent on layers of build material forming z-plane slices (not shown in FIG. 2), followed by the application of energy to bind the build material, e.g. infra-red or ultra-violet light. Build material comprised in a region of a layer which does not form part of a generated object remains unfused following the application of energy. This unfused build material 252 fills the space in build chamber around the generated object 260.

At least one of the build material supply mechanism 235 and the agent ejection mechanism 240, 245 may be moveable relative to the platen 250, e.g. in at least one of the x, y and z directions (wherein the y axis is into the sheet for FIG. 2). At least one of the build material supply mechanism 235, the agent ejection mechanism 240, 245 and the platen 250 may be moveable under control of the deposit controller 220 to achieve this. Additionally, at least one printing liquid (e.g. an ink) may also be deposited on cured and/or uncured layers. In other implementations the apparatus may comprise part of, amongst others, selective laser sintering systems, stereo lithography systems, inkjet systems, fused deposition modelling systems, any 3D printing system, inkjet deposition systems and laminated object manufacturing systems. These include apparatus that directly deposit materials rather than those described that use various agents.

In some examples, the functionality of the print data generation system 100 and the deposit controller 220 may be combined in one embedded system that can receive the 3D model data 104 defining the 3D objects to be generated, or data useable to produce this, and control the apparatus 200 accordingly. This may be the case for a "stand alone" 3D printing apparatus that can receive data, e.g. by physical transfer and/or over a network, and produce an object. For example, such a stand-alone apparatus may be communicatively coupled to a computer device that can send a print job to the apparatus in the manner of a two-dimensional printer. Alternatively, at least some of the functionality illustrated above with respect to print data generation system 100 (and, in some examples, CAD system 102) may be integrated into the apparatus 200 (e.g. into the deposit controller 220). In such examples, the apparatus 200 may include a user console for facilitating interaction with user 108.

Figure 3:
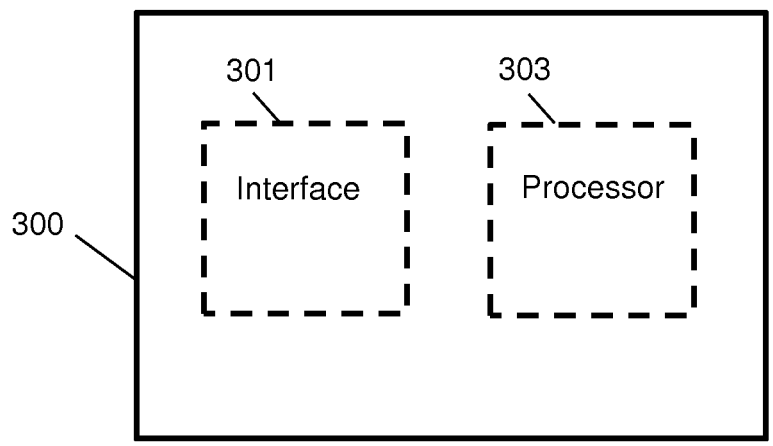
FIG. 3 is a block diagram of an example print data generation system.
Figure 4:
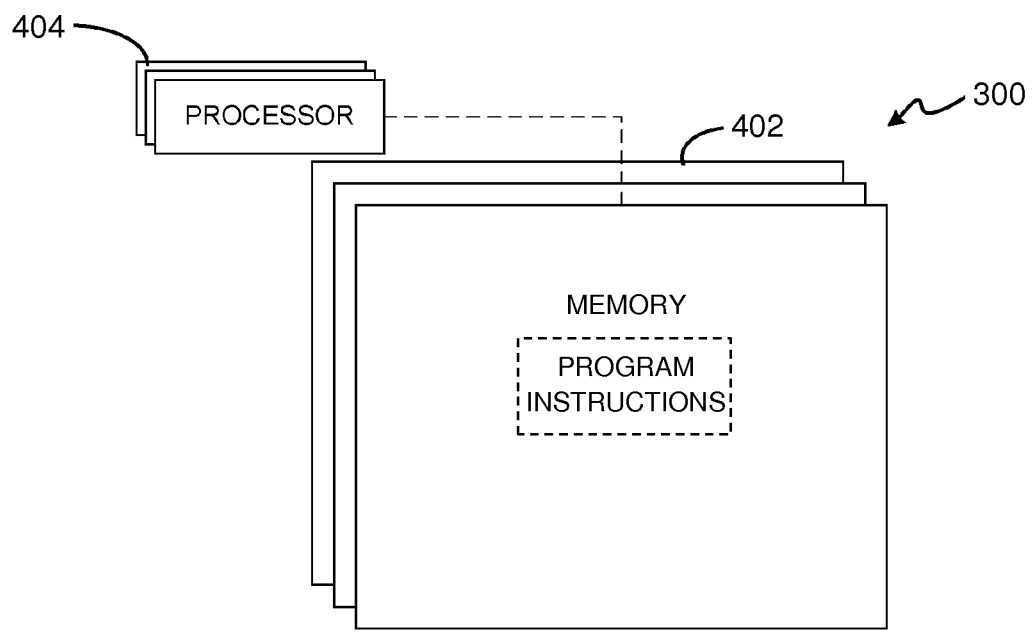
FIG. 4 is a block diagram of an example print data generation system.
Figure 5:
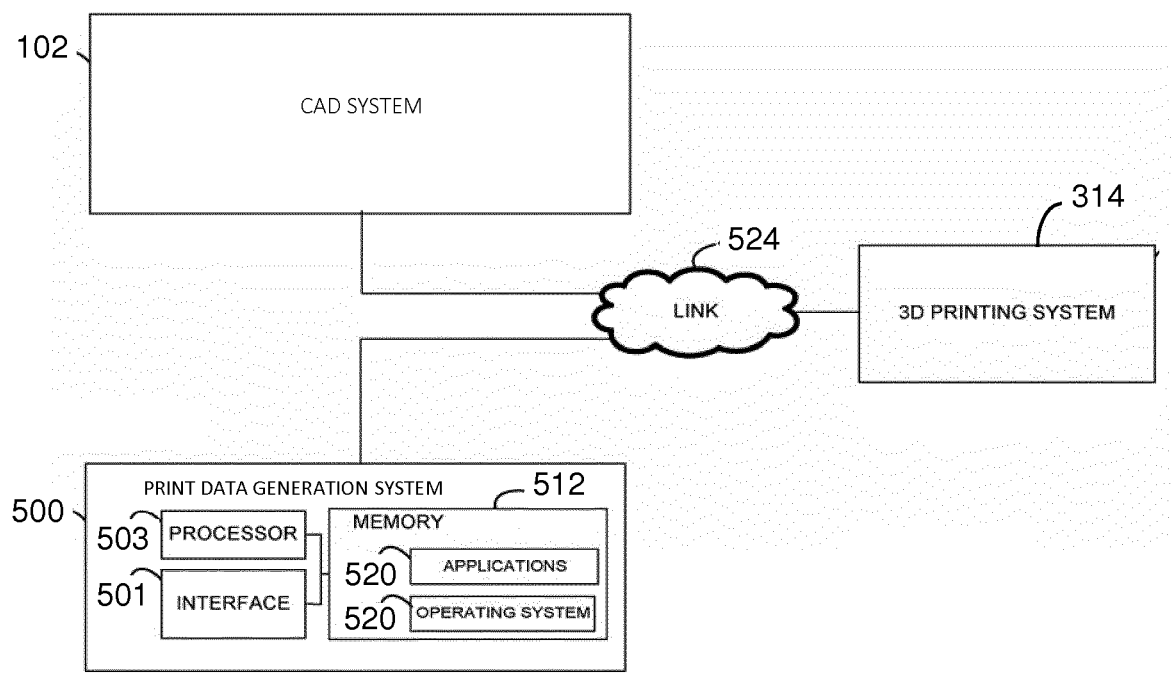
FIG. 5 is a block diagram showing an implementation of an example print data generation system.

FIGS. 3-5 depict various examples of physical and logical components for implementing various examples. FIG. 3 depicts an example print data generation system 300 to generate print data for used by an additive manufacturing system (e.g. the 3D printing system 110 or the additive manufacturing system 200) to generate a plurality of 3D objects in a build chamber using a plurality of build materials. A build material may comprise, e.g., a powder, paste, gel, sludge, a powder suspended in a carrier, etc. The print data generation system comprises an interface 301 and a processor 303. The interface 301 is to receive (e.g. from a source of spatial data such as CAD system 102) first model data associated with a first 3D object. The interface is further to receive (e.g. from a source of spatial data such as CAD system 102) second model data associated with a second 3D object. In some examples, the received first model data and/or the received second model data may comprise a 3D geometry definition data file. The received first model data and/or the received second model data may be used or updated for generating print data as described herein. In some examples the interface is to send generated print data to an additive manufacturing system. In some examples the interface is to receive print setting data, e.g. from a user input function of the print data generation system 300.

The processor 303 is to generate, using the received first model data, first object print data to cause the additive manufacturing system to manufacture the first three-dimensional object from a first powder build material in the build chamber. The processor 303 is further to generate partition print data to cause the additive manufacturing system to manufacture a partition shaped to separate a lower part of the build chamber, containing the first three-dimensional object, from an upper part of the build chamber. The processor 303 is further to generate, using the received second model data, second object print data to cause the additive manufacturing system to manufacture the second three-dimensional object from a second powder build material in the upper part of the build chamber. In some examples the processor 303 is to generate the first print data from the first model data and first print setting data. In some examples the processor 303 is to generate the second print data from the second model data and second print setting data. System 300 may have any or all of the features described above in relation to the print data generation system 100 of FIG. 1.

Print data generation system 300 may comprise any combination of hardware and programming configured for enabling a user (e.g., user 108) to generate print data for use by a 3D printing system (e.g. 3D printing system 110 or apparatus 200) in automatically generating a series of 3D objects (e.g. the object 106*a* and the object 106*b*), each of which may be generated using a different build material (and, in some examples, a different print setting). In some examples print data generation engine 302 may perform this task by operating a GUI with which the user may interact to select an object to be included in the series of objects, and/or to select a print setting (e.g., build material, density, color, roughness, imperviousness, or a selection thereof) specifically for each object of the series of 3D objects. Generating print data may comprise generating a print job formatted according to the particular printing system to generate the object. For manufacturing a given object, the processor 303 may generate a print job including instructions that cause a print system to form a plurality of successive layers. In some examples the processor 303 is to generate a print job with printer commands defining the shape of the successive layers to manufacture an object as well as the physical properties of the successive layers. The defined physical properties within a single layer may vary. As it will be understood, how the instructions are generated depends, among other factors, on the particular 3D printing system to be used for manufacturing an object as described herein.

In some examples print data generation system 300 may comprise a data store in which print data may be stored using any suitable file format. More specifically, print data may be stored using a data file system including at least one file. By way of example, print data may be stored in a plurality of files; 3D model data may be stored in a geometry definition data file suitable to store spatial data of objects and object portions; print setting data (including build material identifier data) may be stored in a settings data file; these files may be inter-referenced (e.g., using tags included in one or both of the files). According to other examples, print data may be stored in a single file.

In some examples the processor 303 is to identify a given object of multiple objects associated with 3D model data received by the print data generation system, e.g. based on an indication of the given object received by the interface 301 (e.g. from a user input function of the print data generation system 300). The indication of the given object may be input by a user. In some examples the print data generation system 300 includes object specification functionality, which may comprise any combination of hardware and programming configured for enabling a user to specify an object to be included in a series of objects to be generated by a 3D printing system. The object specification functionality may comprise a GUI. The object specification functionality may enable a user to specify the object by selecting the object from multiple objects rendered from the first model data and/or the second model. For example, the object specification functionality may process multiple 3D geometry definition data files (e.g., .stl files) to access data corresponding to multiple 3D models with at least one object, and process the accessed data to render the multiple 3D models (and, more specifically, at least one object included in each 3D model) in a particular graphical environment. The object specification functionality may operate a set of GUI controls to facilitate a user selecting a particular object of the multiple objects in the received first model data and/or the received second model data.

In some examples the processor 303 is to identify a print setting selected by the user specifically for a given object (e.g. based on print setting data received by the interface 301), and, once a print setting selection is identified, associate the selected print setting with the given object. Print data generation system 300 may maintain the association between the specifically selected print setting and the corresponding object by inter-referencing portions of print data using a data file system. A specifically selected setting may indicate a specifically selected build material. A specifically selected build material refers to a material selected to be the powder material processed by a 3D printing system (e.g. the 3D printing system 110, or the apparatus 200) to manufacture an object for which the build material is selected. The build material may include plastic material such as a polymer, or any other material suitable for 3D printing. A specifically selected print setting may include a parameter set corresponding to at least one physical property of the object for which the print setting is selected. A physical property refers to a property pertaining to construction of the object, which property is defined during manufacturing of the object by a 3D printing system. In some examples, the parameter set may include density, material, color, roughness, imperviousness, or a selection thereof.

In the foregoing discussion, various components were described as combinations of hardware and programming. Such components may be implemented in a number of fashions. Referring to FIG. 4, the programming may be processor executable instructions stored on tangible memory media 402 and the hardware may include a processor 404 for executing those instructions. Memory 402 can be said to store program instructions that when executed by processor 404 implement system 300 of FIG. 3. Memory 402 may be integrated in the same device as processor 404 or it may be separate but accessible to that device and processor 404.

In examples, the program instructions can be part of an installation package that can be executed by processor 404 to implement system 300. In such examples, memory 402 may be a portable medium such as a CD, DVD, or flash drive or a memory maintained by a server from which the installation package can be downloaded and installed. In another example, the program instructions may be part of an application or applications already installed. Here, memory 402 can include integrated memory such as a hard drive. The executable program instructions stored in memory 402 may comprise program instructions that when executed cause the implementation of the functionality described above in relation to FIG. 3.

As a further example, FIG. 5 depicts a block diagram of an example print data generation system 500, which is an implementation of the print data generation system 100 described above in relation to FIG. 1. In the example of FIG. 5 print data generation system 500 is shown to include memory 512, a processor 503, and an interface 501. Processor 503 represents generally any processor configured to execute program instructions stored in memory 512 to perform various specified functions. Interface 501 represents generally any interface enabling print data generation system 500 to communicate with CAD system 102.

Memory 512 is shown to include operating system 518 and applications 520. Operating system 518 represents a collection of programs that when executed by processor 514 serve as a platform on which applications 520 can run. Examples of operating systems include, but are not limited, to various versions of Microsoft's Windows® and Linux®. Applications 520 represent program instructions that when executed by processor 514 implement print data generation system 500 for enabling a user to generate print data for use by a 3D printing system (e.g. 3D printing system 110 or apparatus 200) in automatically generating a series of 3D objects (e.g. the object 106a and the object 106b), each of which may be generated using a different build material (and, in some examples, a different print setting), as discussed above with respect to FIG. 3.

The components in FIG. 5 interact with each other through a link 524 that represents, generally, at least one of a cable, wireless, fiber optic, or remote connections via a telecommunication link, an infrared link, a radio frequency link, or any other connectors or systems that provide electronic communication. Link 524 may include, at least in part, an intranet, the Internet, or a combination of both. Link 524 may also include intermediate proxies, routers, and/or switches.

As already mentioned above, alternative environments to the examples depicted in FIG. 1 or 5 are contemplated. For example, the functionality of CAD system 102 and print data generation system 500 may be combined on a single system that is configured to, additionally to the functionalities provided by print data generation system 500, generate, modify or store 3D model data. Further, a 3D printing system may include a processor, an interface and a memory configured to implement the functionality of system 500. In some examples a 3D printing system may also include a CAD system 102 as illustrated above.

FIGS. 6-10 are flow diagrams that implement examples of methods for 3D printing of an object. In discussing FIGS. 6-10 reference is made to the diagrams of FIGS. 11 and 12 to provide contextual examples. Implementation, however, is not limited to those examples.

Figure 6:
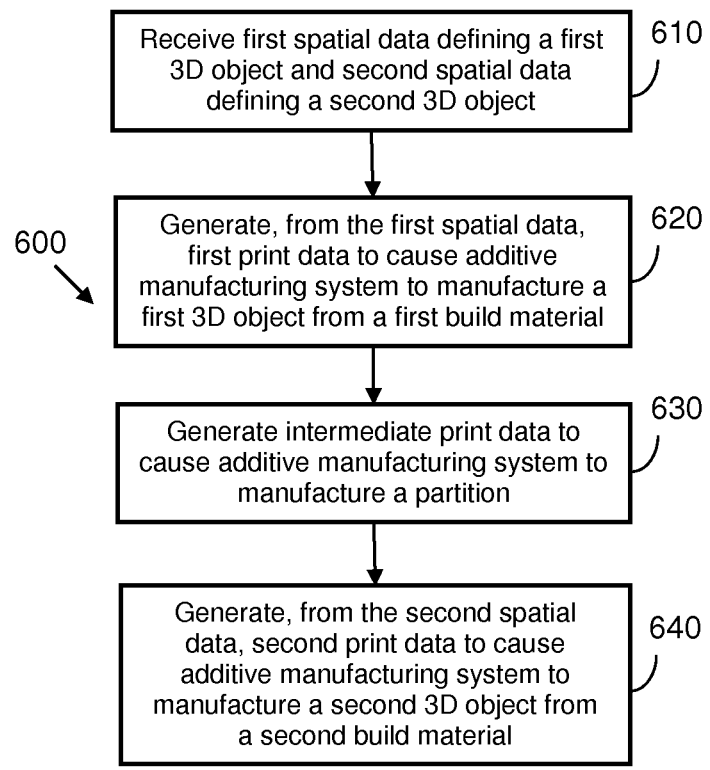
FIGS. 6 and 7 are flow diagrams that implement examples of methods for generating print data.

FIG. 6 illustrates an example method 600 of generating print data for use by an additive manufacturing system to generate a plurality of three-dimensional objects within a build chamber having a build surface. In block 610, first spatial data defining a first three-dimensional object and second spatial data defining a second three-dimensional object is received, e.g. by an interface of a print data generation system (such as any of the print data generations systems 100, 300 and 500). Receiving the first spatial data and the second spatial data may be performed in any of the manners described above in relation to FIGS. 1 to 5.

In block 620 first print data is generated from the first spatial data. The first print data is to cause the additive manufacturing system to manufacture the first three-dimensional object from a first build material by alternately depositing and selectively solidifying at least one layer of the first build material. The first build material may comprise a powder, e.g. a powdered plastics material or a powdered metal. In some examples the first print data is to cause the additive manufacturing system to operate in accordance with a first set of operating parameters associated with the first build material. For example, if the additive manufacturing system is to solidify a layer of build material by applying heat, the temperature of the applied heat is an operating parameter. Other operating parameters may comprise or relate to, for example, a shrinkage compensation factor, a minimum feature size, a minimum gap between objects, a number of passes, agent dosages, annealing times, etc. The first set of operating parameters may be based, partly or wholly, on at least one user selected print setting. The first print data may be generated, for example, by a processor of a print data generation system (such as any of the print data generations systems 100, 300 and 500). The first print data may have any of the features of the print data described above in relation to FIGS. 1-5. The first print data may be generated in any of the manners for generating print data described above in relation to FIGS. 1-5.

In block 630 intermediate print data is generated. The intermediate print data is to cause the additive manufacturing system to manufacture a partition by alternately depositing and selectively solidifying at least one layer of a build material. The partition comprises a three-dimensional object configured to fill the build chamber in a plane parallel to the build surface. It will be appreciated that the partition does not have to include a surface parallel to the build surface in order to fill the build chamber in a plane parallel to the build surface. Instead, a partition of any shape and orientation which has the effect of dividing the build chamber into an upper part and a lower part, such that build material in the upper part is prevented from passing into the lower part, is considered to fill the build chamber in a plane parallel to the build surface. The intermediate print data may cause the additive manufacturing system to manufacture a partition by fully solidifying at least one layer of a build material (i.e. such that the whole area of the layer is solidified).

The intermediate print data may be generated, for example, by a processor of a print data generation system (such as any of the print data generations systems 100, 300 and 500). The intermediate print data may have any of the features of the print data described above in relation to FIGS. 1-5. The intermediate print data may be generated in any of the manners for generating print data described above in relation to FIGS. 1-5.

In some examples the intermediate print data is to cause the additive manufacturing system to manufacture the partition from the first build material. In some examples the intermediate print data is to cause the additive manufacturing system to manufacture the partition from the second build material. In some examples the intermediate print data is to cause the additive manufacturing system to manufacture a first part of the partition from the first build material and subsequently manufacture a second part of the partition from the second build material. In some examples the intermediate print data is to cause the additive manufacturing system to operate in accordance with a first set of operational parameters (i.e. the set of operational parameters used to manufacture the first 3D object) during the manufacturing of a first part of the partition and subsequently to operate in accordance with a second set of operational parameters (i.e. a set of operational parameters to be used to manufacture the second 3D object) during the manufacturing of a second part of the partition.

In some examples, the partition may comprise a predefined number of layers of build material. In some examples the partition may comprise a predefined number of layers of first build material, and a predefined number of layers of second build material. In some examples the partition may comprise at least one layer including some first build material and some second build material (e.g. if the first and second build materials are supplied from the same source, such as a hopper filled, layerwise, with a predetermined amount of first build material and a predetermined amount of second build material. In such examples it may not be possible to determine exactly the composition of a layer of build material during a period in which the additive manufacturing system is transitioning from using the first build material to using the second build material. In some such examples the partition may comprise a minimum number of layers selected to ensure that all layers which potentially contain a mix of first build material and second build material are comprised in the partition. Contamination of the upper part of the build chamber, and thus the second 3D object, with first build material can thereby be avoided.

In some examples the intermediate print data is to cause the additive manufacturing system to manufacture a partition having an upper surface of equal shape and size and orientation to the build surface. In such examples the partition provides a build surface on which the second 3D object can be manufactured. In some examples the intermediate print data is to cause the additive manufacturing system to manufacture a partition in the form of a prism with a base of equal shape and size to the build surface. For example, if the build surface is square, the intermediate print data may cause the additive manufacturing system to manufacture a cubic or cuboidal partition. In some examples the intermediate print data is to cause the additive manufacturing system to manufacture a partition in the form of a sealed container comprising at least one wall enclosing a volume, by solidifying build material to form the at least one wall of the container and leaving build material in the enclosed volume unsolidified. Such examples can minimize the amount of energy used in the manufacturing of the partition.

In block 640 second print data is generated from the second spatial data. The second print data is to cause the additive manufacturing system to manufacture the second three-dimensional object from a second build material by alternately depositing and selectively solidifying at least one layer of the second build material. The second build material may comprise a powder, e.g. a powdered plastics material or a powdered metal. The second build material may differ from the first build material in respect of at least one property. For example, the second build material may differ from the first build material in respect of at least one of: material type (i.e. plastics, metal, ceramic, etc.), material composition, color, melting point, particle size. In some examples the second build material may be the same as the first build material. In some examples the second print data is to cause the additive manufacturing system to operate in accordance with a second set of operating parameters associated with the second build material. The second set of operating parameters may be based, partly or wholly, on at least one user selected print setting. The second print data may be generated, for example, by a processor of a print data generation system (such as any of the print data generations systems 100, 300 and 500). The second print data may have any of the features of the print data described above in relation to FIGS. 1-5. The second print data may be generated in any of the manners for generating print data described above in relation to FIGS. 1-5.

Figure 7:
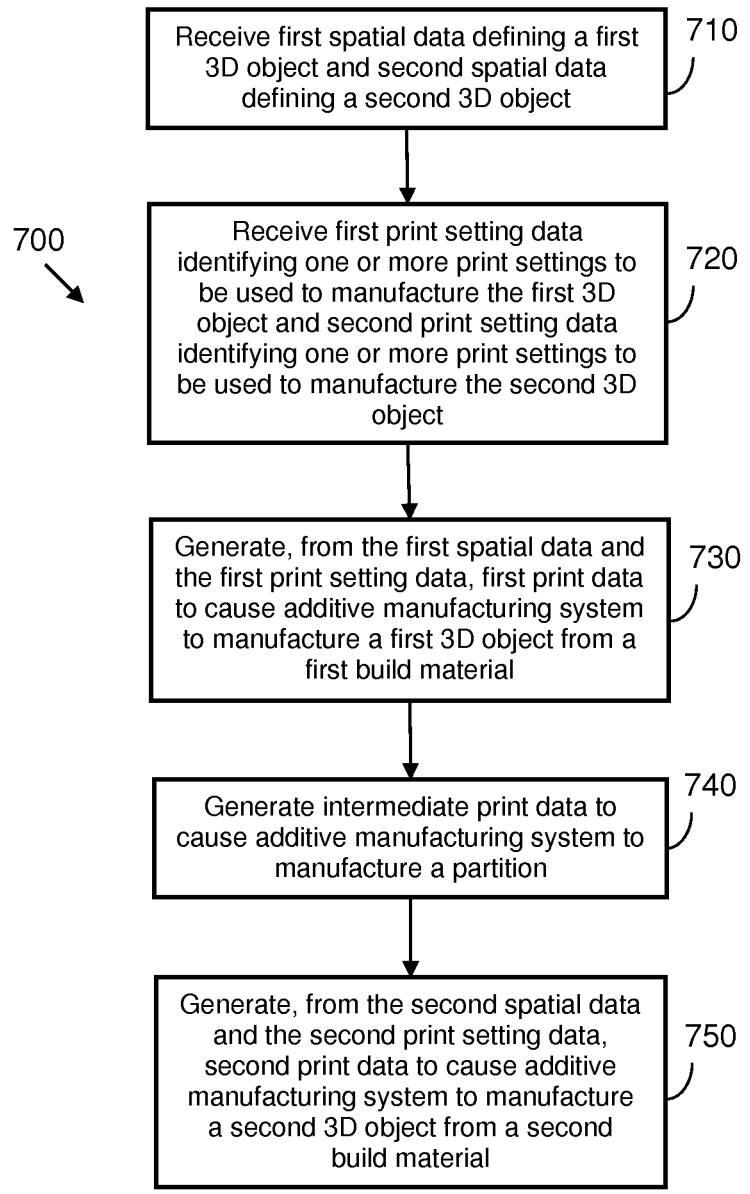

FIG. 7 illustrates another example method 700 of generating print data for use by an additive manufacturing system to generate a plurality of three-dimensional objects within a build chamber having a build surface. Block 710 is the same as block 610 of FIG. 6, and may be performed as described above in relation to block 610.

In block 720, first print setting data is received and second print setting data is received. The first print setting data identifies at least one print setting to be used to manufacture the first object. The second print setting data identifies at least one print setting to be used to manufacture the second object. In some examples the first print setting data comprises a first build material identifier identifying a build material to be used to manufacture the first object and the second print setting data comprises a second build material identifier identifying a build material to be used to manufacture the second object.

In block 730 first print data is generated. The first print data is to cause the additive manufacturing system to manufacture a first 3D object from a first build material. Block 730 is the same as block 630 of FIG. 6, and may be performed in the same manner, except that in block 730 the first print data is generated from the first spatial data and the first print setting data. The first print data thereby is to cause the additive manufacturing system to manufacture the first 3D object in accordance with the at least one print setting identified by the first print setting data.

Block 740 is the same as block 630 of FIG. 6, and may be performed as described above in relation to block 630. In some examples the intermediate print data is to cause the additive manufacturing system to manufacture the partition in accordance with the at least one print setting identified by the first print setting data. In some examples the intermediate print data is to cause the additive manufacturing system to manufacture the partition in accordance with the at least one print setting identified by the second print setting data. In some examples the intermediate print data is to cause the additive manufacturing system to manufacture a first part of the partition in accordance with the at least one print setting identified by the first print setting data and to subsequently manufacture a second part of the partition in accordance with the at least one print setting identified by the second print setting data.

In block 750 second print data is generated. The second print data is to cause the additive manufacturing system to manufacture a second 3D object from a second build material. Block 750 is the same as block 640 of FIG. 6, and may be performed in the same manner, except that in block 750 the second print data is generated from the second spatial data and the second print setting data. The second print data thereby is to cause the additive manufacturing system to manufacture the second 3D object in accordance with the at least one print setting identified by the second print setting data. The at least one print setting identified by the second print setting data may be the same as the at least one print setting identified by the first print setting data. In some examples the at least one print settings identified by the second print setting data differ, in respect of at least one print setting, to the at least one print setting identified by the first print setting data.

Figure 8:
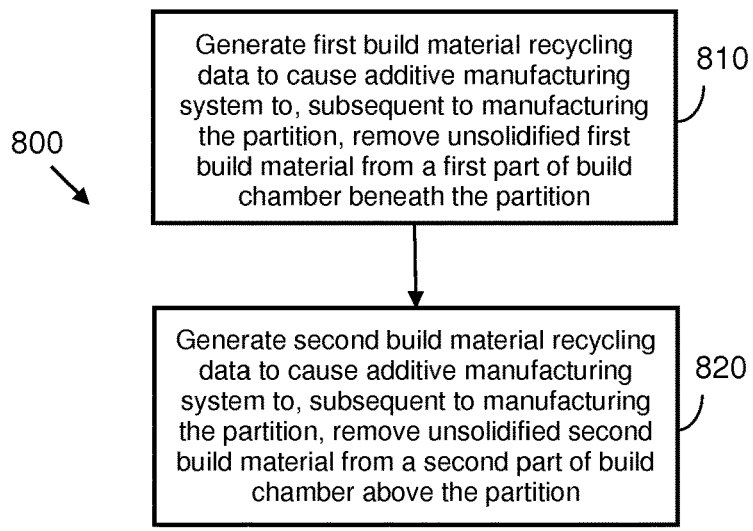
FIGS. 8-10c are flow diagrams that implement example sub-methods of example methods for generating print data.

FIG. 8 illustrates an example sub-method 800, which may be comprised in a method of generating print data for use by an additive manufacturing system to generate a plurality of three-dimensional objects within a build chamber having a build surface (e.g. the method 600 of FIG. 6 or the method 700 of FIG. 7). In block 810 first build material recycling data is generated. The first build material recycling data is to cause the additive manufacturing system to, subsequent to the manufacturing of a partition, remove unsolidified first build material from a first part of the build chamber located beneath the partition. In block 820 second build material recycling data is generated. The second build material recycling data is to cause the additive manufacturing system to, subsequent to the manufacturing of the partition, remove unsolidified second build material from a second part of the build chamber located above the partition. The second build material recycling data may be, for example, to cause the additive manufacturing system to remove the first build material and/or the second build material using a vacuum system. The sub-method 800 may be performed as part of the method 600 of FIG. 6, or as part of the method 700 of FIG. 7.

Figure 9A:
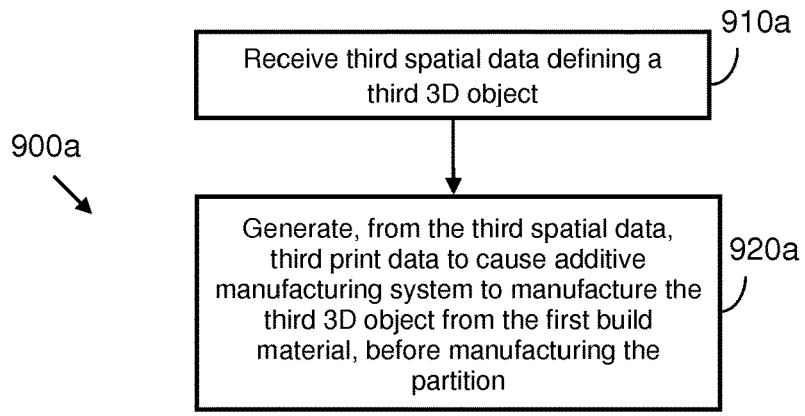

FIG. 9a illustrates an example sub-method 900a, which may be comprised in a method of generating print data for use by an additive manufacturing system to generate a plurality of three-dimensional objects within a build chamber having a build surface (e.g. the method 600 of FIG. 6 or the method 700 of FIG. 7). In block 910a third spatial data defining a third 3D object is received. Receiving the third spatial data may be performed in any of the manners described above for receiving the first spatial data and receiving the second spatial data, as described in relation to FIG. 6. In block 920a, third print data is generated from the third spatial data. The third print data is to cause the additive manufacturing system to manufacture the third three-dimensional object from the first build material by alternately depositing and selectively solidifying at least one layer of the first build material, before manufacturing a partition. The sub-method 900a may be performed as part of the method 600 of FIG. 6, or as part of the method 700 of FIG. 7. The third three-dimensional object may be manufactured before, after, or simultaneously with the first three-dimensional object.

Figure 9B:
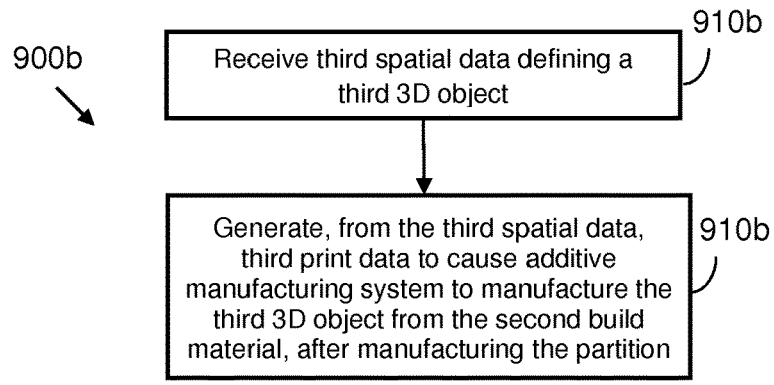

FIG. 9b illustrates another example sub-method 900b, which may be comprised in a method of generating print data for use by an additive manufacturing system to generate a plurality of three-dimensional objects within a build chamber having a build surface (e.g. the method 600 of FIG. 6 or the method 700 of FIG. 7). In block 910b third spatial data defining a third 3D object is received. Receiving the third spatial data may be performed in any of the manners described above for receiving the first spatial data and receiving the second spatial data, as described in relation to FIG. 6. In block 920b, third print data is generated from the third spatial data. The third print data is to cause the additive manufacturing system to manufacture the third three-dimensional object from the second build material by alternately depositing and selectively solidifying at least one layer of the second build material, after manufacturing a partition. The sub-method 900a may be performed as part of the method 600 of FIG. 6, or as part of the method 700 of FIG. 7. The third three-dimensional object may be manufactured before, after, or simultaneously with the second three-dimensional object.

Figure 10A:
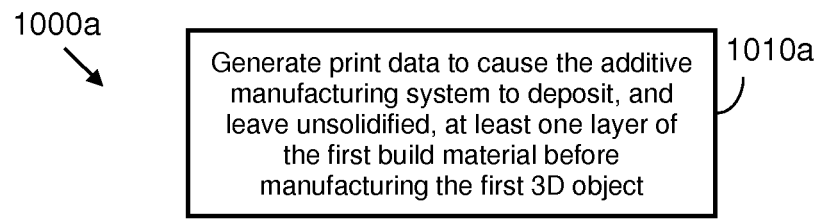

FIG. 10a illustrates another example sub-method 1000a, which may be comprised in a method of generating print data for use by an additive manufacturing system to generate a plurality of three-dimensional objects within a build chamber having a build surface (e.g. the method 600 of FIG. 6 or the method 700 of FIG. 7). In block 1010a, print data is generated to cause the additive manufacturing system to deposit, and leave unsolidified, at least one layer of the first build material before manufacturing a first three-dimensional object. Providing at least one layer of unsolidified material between the build surface and the first 3D object can facilitate removal of the first 3D object from the build chamber. Providing at least one layer of unsolidified material between the build surface and the first 3D object also facilitates stabilization of the printer and the print bed to a steady operating state, to ensure the whole object is produced under the same printing conditions.

Figure 10B:
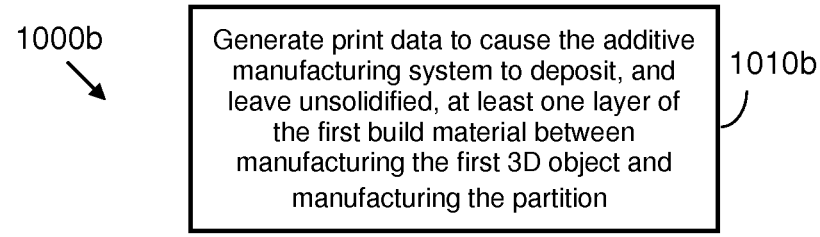

FIG. 10b illustrates another example sub-method 1000b, which may be comprised in a method of generating print data for use by an additive manufacturing system to generate a plurality of three-dimensional objects within a build chamber having a build surface (e.g. the method 600 of FIG. 6 or the method 700 of FIG. 7). In block 1010b, print data is generated to cause the additive manufacturing system to deposit, and leave unsolidified, at least one layer of the first build material between manufacturing a first three-dimensional object and manufacturing the partition. Providing at least one layer of unsolidified material between the first 3D object and the partition ensures that the partition is separate from the first 3D object.

Figure 10C:
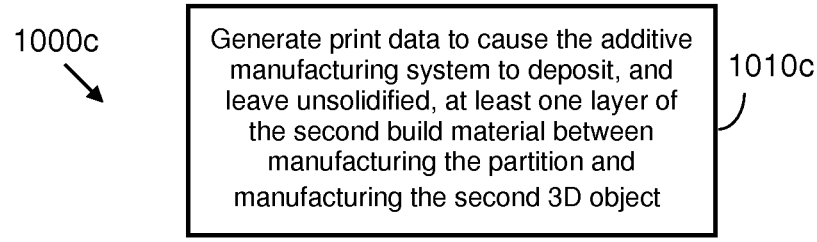

FIG. 10c illustrates another example sub-method 1000c, which may be comprised in a method of generating print data for use by an additive manufacturing system to generate a plurality of three-dimensional objects within a build chamber having a build surface (e.g. the method 600 of FIG. 6 or the method 700 of FIG. 7). In block 1010c, print data is generated to cause the additive manufacturing system to deposit, and leave unsolidified, at least one layer of the second build material between manufacturing a partition and manufacturing the second three-dimensional object. Providing at least one layer of unsolidified material between the second 3D object and the partition ensures that the partition is separate from the second 3D object.

Figure 12:
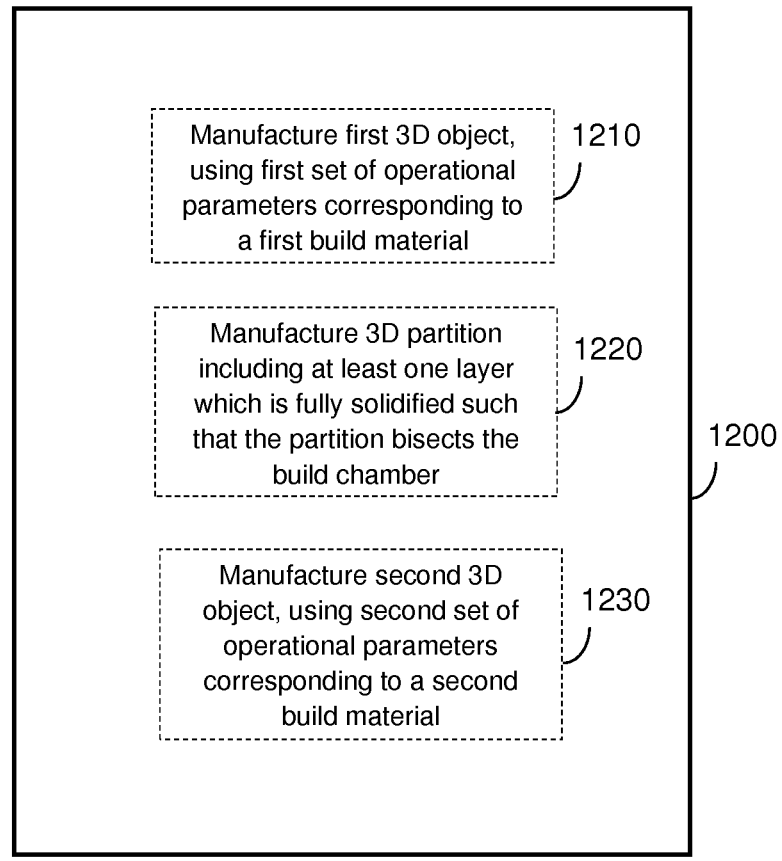
FIG. 12 is a block diagram of a computer readable medium according to an example.

In some examples the print data generated by any of the example methods 600 or 700 may be encoded on a computer readable memory. In some such examples the print data comprises instructions to cause an additive manufacturing system to perform various operations involved in generating a plurality of 3D objects. FIG. 12 shows an example computer readable memory 1200 encoded with example instructions 1210, 1220 and 1230.

The example instruction 1210 is to cause an additive manufacturing system (e.g. the 3D printing system 110 or the additive manufacturing system 200) to manufacture a first three-dimensional object, by alternately depositing and selectively solidifying in the build chamber at least one layer of build material, using a first set of operational parameters corresponding to the first build material. The example instruction 1220 is to cause the additive manufacturing system to manufacture a 3D partition, by alternately depositing and selectively solidifying in the build chamber at least one layer of build material, the partition including at least one layer which is fully solidified such that the partition bisects the build chamber. In some examples the example instruction 1220 is to cause the additive manufacturing system to manufacture the three-dimensional partition using the first set of operational parameters. In some examples the example instruction 1220 is to cause the additive manufacturing system to manufacture the three-dimensional partition using the second set of operational parameters. In some examples the example instruction 1220 is to cause the additive manufacturing system to manufacture a first part of the three-dimensional partition using the first set of operational parameters and subsequently manufacture a second part of the three-dimensional partition using the second set of operational parameters. The example instruction 1230 is to cause the additive manufacturing system to manufacture a second three-dimensional object, by alternately depositing and selectively solidifying in the build chamber at least one layer of build material, using a second set of operational parameters corresponding to the second build material.

The computer readable memory can be any media that can contain, store, or maintain programs and data for use by or in connection with an instruction execution system. Machine-readable media can comprise any one of many physical media such as, for example, electronic, magnetic, optical, electromagnetic, or semiconductor media. More specific examples of suitable machine-readable media include, but are not limited to, a hard drive, a random access memory (RAM), a read-only memory (ROM), an erasable programmable read-only memory, or a portable disc.

Figure 11A:
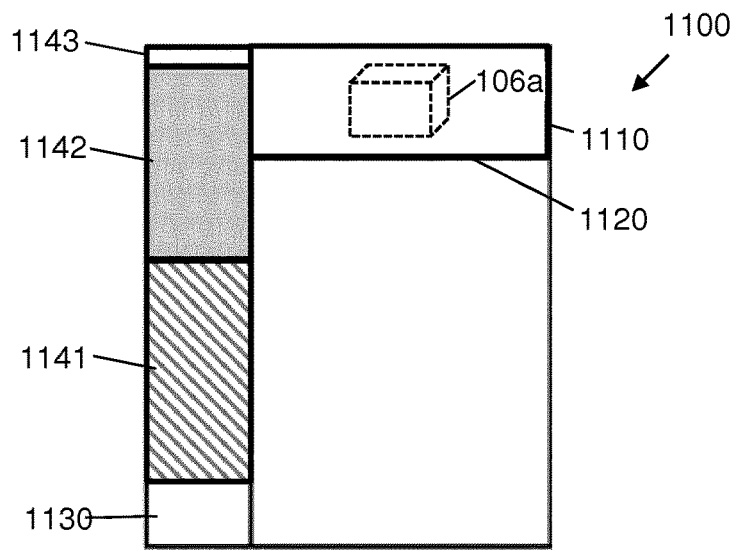
FIGS. 11a-c are schematic views of an example additive manufacturing system at various stages during manufacturing of a plurality of 3D objects.
Figure 11B:
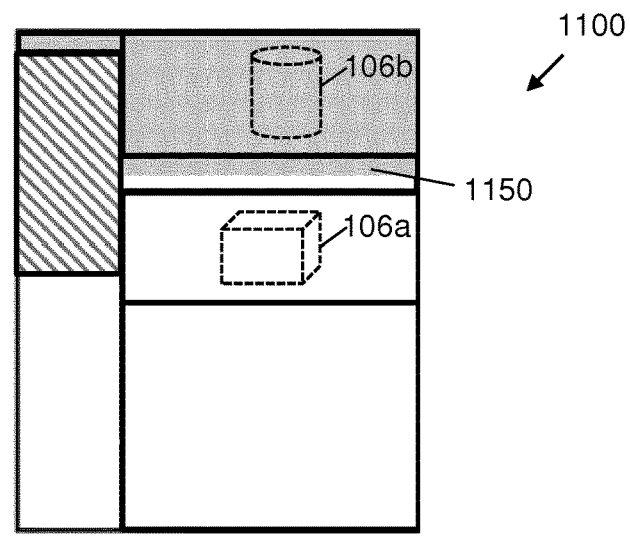
Figure 11C:
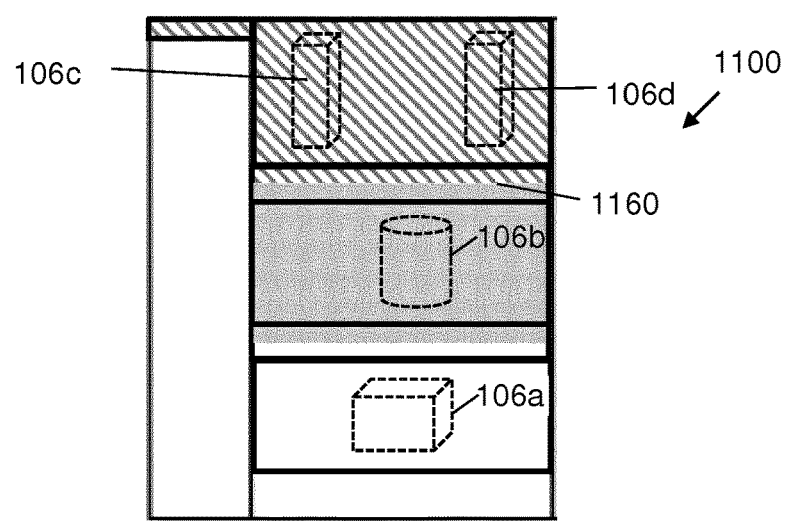

When the print data generated by the examples is used by the additive manufacturing system to manufacture of the first and second 3D objects, the print data causes the additive manufacturing system to also manufacture a partition between the first 3D object and the second 3D object. An example manufacturing process performed by an additive manufacturing system implementing print data according to the examples is illustrated by FIGS. 11a-c. FIGS. 11a-c show an additive manufacturing system 1100 comprising a build chamber 1110 having a build surface 1120. The build surface 1120 is moveable in the vertical direction, so as to controllably alter the height of the build chamber 1110. The additive manufacturing system 1100 further comprises a source of build material, which in this example is in the form of a single supply hopper 1130. The supply hopper 1130 supplies build material to a deposit mechanism (not shown) from a top end of the supply hopper. The base of the supply hopper is to move upwardly (with respect to the orientation shown in FIGS. 11a-c) as build material is supplied to the deposit mechanism and thereby leaves the supply hopper. The additive manufacturing system 1100 may comprise any or all of the features described above in relation to the additive manufacturing system 200 of FIG. 2.

In the illustrated example, the additive manufacturing system 1100 is shown performing a manufacturing process in which three different build materials (a first build material 1141, a second build material 1142 and a third build material 1143) are used to manufacture four different 3D objects. In the illustrated example, the first build material 1141 has high abrasion resistance and is used to print a first 3D object 106a comprising a mechanical gears. The second build material 1142 is stable over a wide temperature range and is used to print a second 3D object 106b comprising an automotive part. The third build material 1143 is a bio-compatible material and is used to produce a third 3D object 106c and a fourth 3D object 106d, each of which comprises a medical parts. The supply hopper 1130 has been loaded with a predefined amount of each of the first build material, the second build material and the third build material, in the order in which they are to be used during the manufacturing process. In some examples in which the first, second and third build materials differ in respect of, e.g., the amount of heat used for solidification, the order in which the first, second and third build materials are used during the manufacturing process is selected such that a material requiring a relatively greater applied heat is used before a material requiring a relatively lesser applied heat. Similar considerations may apply in respect of other properties which differ between the build materials.

In some examples the predefined amount (in volume terms) of each build material may be computed using the following equation $$\text{Material}_x = \left[ SL + \sum_{L=0}^{\#\,layers} (1 + S \cdot \text{pixels}\%_L) + DL \right] * \text{bed size} * \text{layer thickness} \quad \text{(equation 1)}$$

in which x represents a given build material; SL represents a number of layers to be left unsolidified before the manufacture of a given 3D object, DL represents a number of layers to be deposited after the manufacture of the given 3D object before transitioning to a different build material; $S.\text{pixels}\,\%_L$ represents the percentage of pixels of a given layer (i.e. comprised in the given 3D object) which will be solidified; bed size represents the area of the build surface; and layer thickness represents the thickness of the layers deposited by the additive manufacturing system. It can then be determined where the base of the supply hopper should be positioned in order for the supply hopper to be completely filled by the first, second and third build material. In some examples the position of the base of the supply hopper can be computed by performing the following calculation in respect of each of the first, second and third build materials:

$$\text{Material height} = \frac{\text{Material}_x}{\text{Supply hopper base size}} \quad \text{(equation 2)}$$

in which "Material height" indicates the height of the supply hopper that will be taken up by the predefined amount of the given build material. The supply hopper is then loaded accordingly, with the third build material being loaded first (so that it is at the bottom of the supply hopper) and the first build material being loaded last (so that it is at the top of the supply hopper). It will be appreciated that the supply hopper loading process described above can be extended to systems which comprise more than one supply hopper.

Controlled loading of a single supply hopper, as described above, provides one way to achieve an automatic (i.e. without requiring the intervention of an operator) transition from one build material to another at an appropriate time during a manufacturing process to manufacture multiple objects from different build materials. Alternative examples are possible in which the additive manufacturing system includes separate supplies of each build material to be used during the manufacturing process, and a mechanism for switching between the various supplies at appropriate stages of the manufacturing process. In some such examples the print data will include data to cause the additive manufacturing system to switch from depositing build material from a first supply, containing a first build material, to depositing build material from a second supply, containing a second build material, between manufacturing the first 3D object and manufacturing the second 3D object. In some examples the print data will include data to cause the additive manufacturing system to switch from depositing build material from a first supply, containing a first build material, to depositing build material from a second supply, containing a second build material, during manufacturing of a partition.

Figure 13:
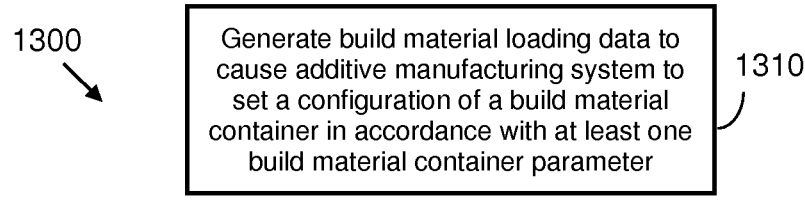
FIG. 13 is a flow diagram that implements an example sub-method of example methods for generating print data.

FIG. 13 illustrates an example sub-method 1300, which may be comprised in a method of generating print data for use by an additive manufacturing system to generate a plurality of three-dimensional objects within a build chamber having a build surface (e.g. the method 600 of FIG. 6 or the method 700 of FIG. 7). In block 1310 build material loading data, to cause the additive manufacturing system to set a configuration of a build material container of the additive manufacturing system in accordance with at least one build material container parameter comprised in the build material loading data, is generated. The at least one build material container parameter may comprise, e.g., at least one of: container volume; container height, container depth, container width, container length, container orientation, etc. Generating the build material loading data may comprise calculating a volume of the first build material to be used in generating the plurality of 3D objects and calculating a volume of the second build material to be used in generating the plurality of 3D objects. The volume of the first build material and the volume of the second build material may be calculated in the manner described above (e.g. using equation 1). In some examples generating the build material loading data may comprise determining the at least one build material container parameter based on the calculated volume of the first build material and the calculated volume of the second build material. In some examples the at least one build material container parameter may be determined as described above (e.g. using equation 2).

At the process stage shown by FIG. 11a, the first 3D object 106a has been manufactured using the first build material 1141. Most of the first build material 1141 has left the supply hopper 1130 and has been used in the manufacture of the first 3D object 106a. However; a small amount of first build material 1141 remains at the top of the supply hopper 1130. The additive manufacturing system 1100 then manufactures a first partition 1150. In the illustrated example, the first partition 1150 is in the form of a cuboidal container comprising a base, side walls, and a lid. However, in other examples the partition may have any of the features described above in relation to FIGS. 6 and 7. The configuration of the first partition is such that the left-over first build material 1141 is sufficient to manufacture at least the base of the partition but is not sufficient to fully manufacture the side walls. As such, the transition from the first build material 1141 to the second build material 1142 occurs during the manufacturing of the side walls. The lid of the partition will therefore be manufactured from the second build material 1142. It will be appreciated that even if the supply hopper 1130 is loaded very precisely, it is likely that some of the layers deposited during the transition from the first build material to the second build material will contain a mixture of the first and second build materials. The first partition 1150 is configured such that any mixed layers will be partially solidified to form the walls of the partition, with the unsolidified mixed materials being contained within the interior space of the partition 1150. In the illustrated example, the height of the partition is twice the number DL of layers of first material to be deposited after manufacturing of the first 3D object is complete, however in other examples the partition height may comprise fewer or more layers. The partition height may depend on details of the additive manufacturing system, e.g. details of a build material supply mechanism of the additive manufacturing system. If the build material supply mechanism enables very precise control over the layer composition during a transition from one build material to another, a relatively smaller (in height) partition may be manufactured. The partition 1150 can be easily be discarded when the manufacturing process is complete.

In some examples the operational parameters of the additive manufacturing system 1100 are also changed during the manufacturing of the first partition 1150, substantially or exactly coinciding with the transition from manufacturing using the first build material to manufacturing using the second build material. Depending on the nature of the change to the operational parameters, a non-zero time period may be used to enable the printing conditions to stabilize following such a change. Therefore, in some examples the partition height is selected such that printing conditions are stable by the time manufacture of the partition is completed.

The lid of the first partition 1150 comprises a flat upper surface having the same shape, size and orientation as the build surface 1120. The upper surface of the first partition can thereby function as a build surface on which the second 3D object 106b can be manufactured.

At the process stage shown by FIG. 11b, the second 3D object 106b has been manufactured using the second build material 1142. Most of the second build material 1142 has left the supply hopper 1130 and has been used in the manufacture of the second 3D object 106b. However; a small amount of second build material 1142 remains at the top of the supply hopper 1130. The additive manufacturing system 1100 then manufactures a second partition 1160. In this example the second partition 1160 is the same as the first partition 1150, except that it is manufactured from the second build material 1142 and the third build material 1143, instead of the first build material 1141 and the second build material 1142. The second partition may, however, in alternative examples be different from the first partition in respect of shape, size, configuration, or any other aspect. The second partition 1160 may have any or all of the features of the first partition 1150.

At the process stage shown by FIG. 11c, the third 3D object 106c and the fourth 3D object 106d have been manufactured using the third build material 1143. Most of the third build material 1142 has left the supply hopper 1130 and has been used in the manufacture of the third and fourth 3D objects 106c, 106d. However; a small amount of third build material 1143 remains at the top of the supply hopper 1130. In the illustrated example, the process is complete once the third and fourth 3D objects have been manufactured. However; in examples in which further objects are to be manufactured, using a material other than the third material, the third build material 1143 which remains in the supply hopper 1130 can be used to manufacture a third partition, i.e. in the manner described above in relation to the first partition 1150 and the second partition 1160. In the case that no further 3D objects are to be manufactured, the left over third build material can be removed from the supply hopper 1130 and recycled.

Following the manufacture of the third and fourth 3D objects 106c, 106d, unsolidified build material can be removed from the build chamber 1110, e.g. using a vacuum mechanism. For example, unsolidified third build material can be removed from an uppermost part of the build chamber, above the second partition 1160. Since the unsolidified third build material 1143 has been prevented from mixing with the unsolidified build material 1142 by the presence of the second partition 1160, it can be recycled for use in a further manufacturing process. The third and fourth 3D objects 106c and 106d can then be removed from the uppermost part of the build chamber. Following removal of the third and fourth 3D objects and the unsolidified third build material 1143 from the build chamber, the second partition 1160 can be removed from the build chamber and disposed of. The unsolidified second build material and second 3D object are then removed from the middle part of the build chamber (i.e. the part between the first partition 1150 and the second partition 1160) in a similar manner. When the unsolidified second build material and second 3D object 106b have been removed from the build chamber, the first partition 1150 can be removed and disposed of. The unsolidified first build material and first 3D object 106a are then removed from the lowermost part of the build chamber (i.e. the part between the first partition 1150 and the build surface 1120).

Thus, it can be seen that the effect of manufacturing a partition between manufacturing a first 3D object and a second 3D object is to divide the build chamber into a lower part, containing the first 3D object, and an upper part, in which the second 3D object is manufactured. Any unsolidified first build material, used to manufacture the first 3D object, is fully enclosed in the lower part of the build chamber by the build chamber walls and a lower surface of the partition. The upper surface of the partition provides a support on which the second build material is deposited for manufacturing the second 3D object. The second build material is prevented from contacting unsolidified first build material by virtue of the partition completely filling the build chamber in a plane parallel to the build surface. Mixing of unsolidified first build material and unsolidified second build material is thereby avoided. This enables unsolidified first build material to be removed from the lower part of the build chamber for recycling, and unsolidified second build material to be removed from the upper part of the build chamber for recycling. Furthermore, the manufacturing process can run from start to finish without any input from an operator, meaning that a process to manufacture multiple objects from different build materials can be implemented, e.g., overnight, enabling efficient use of an additive manufacturing system.

FIGS. 1-5 aid in depicting the architecture, functionality, and operation of various examples. In particular, FIGS. 3-5 depict various physical and logical components. Various components illustrated in FIGS. 3-5 are defined at least in part as programs, programming, or program instructions. Each such component, portion thereof, or various combinations thereof may represent in whole or in part a module, segment, or portion of code that comprises at least one executable instruction to implement any specified logical function(s). Each component or various combinations thereof may represent a circuit or a number of interconnected circuits to implement the specified logical function(s).

Examples can be realized in any computer-readable media for use by or in connection with an instruction execution system such as a computer/processor based system or an ASIC (Application Specific Integrated Circuit) or other system that can fetch or obtain the logic from computer-readable media and execute the instructions contained therein. "Computer-readable media" can be any media that can contain, store, or maintain programs and data for use by or in connection with the instruction execution system. Computer readable media can comprise any one of many physical media such as, for example, electronic, magnetic, optical, electromagnetic, or semiconductor media. More specific examples of suitable computer-readable media include, but are not limited to, a portable magnetic computer diskette such as floppy diskettes or hard drives, a random access memory (RAM), a read-only memory (ROM), an erasable programmable read-only memory, or a portable compact disc.

Although the flow diagrams in FIGS. 6-9 show specific orders of execution, the order of execution may differ from that which is depicted. For example, the order of execution of two or more blocks may be scrambled relative to the order shown. Also, two or more blocks shown in succession may be executed concurrently or with partial concurrence. All such variations are contemplated.

In the foregoing description, numerous details are set forth to provide an understanding of the examples disclosed herein. However, it will be understood that the examples may be practiced without these details. While a limited number of examples have been disclosed, numerous modifications and variations therefrom are contemplated. It is intended that the appended claims cover such modifications and variations. Claims reciting "a" or "an" with respect to a particular element contemplate incorporation of at least one such element, neither requiring nor excluding two or more such elements. Further, the terms "include" and "comprise" are used as open-ended transitions.

What is claimed is:

1. A method of generating print data for use by an additive manufacturing system to generate a plurality of three-dimensional objects within a build chamber having a build surface, the method comprising:

receiving first spatial data defining a first three-dimensional object and second spatial data defining a second three-dimensional object;

generating, from the first spatial data, first print data to cause the additive manufacturing system to manufacture the first three-dimensional object at least partly from a first build material by depositing and selectively solidifying at least one layer of build material comprising the first build material;

generating intermediate print data to cause the additive manufacturing system to manufacture a partition by depositing and selectively solidifying at least one layer of build material to separate a first lower part of the build chamber, containing the first three-dimensional object, from a first upper part of the build chamber, the partition comprising a three-dimensional object configured to fill the build chamber in a plane parallel to the build surface; and generating, from the second spatial data, second print data to cause the additive manufacturing system to manufacture the second three-dimensional object in the first upper part of the build chamber at least partly from a second build material by depositing and selectively solidifying at least one layer of build material comprising the second build material.

2. A method according to claim 1, wherein the intermediate print data is to cause the additive manufacturing system to:

manufacture the partition from the first build material; or manufacture the partition from the second build material; or manufacture a first part of the partition from the first build material and subsequently manufacture a second part of the partition from the second build material.

3. A method according to claim 1, wherein the first print data is to cause the additive manufacturing system to operate in accordance with a first set of operating parameters associated with the first build material and the second print data is to cause the additive manufacturing system to operate in accordance with a second set of operating parameters associated with the second build material.

4. A method according to claim 3, wherein the intermediate print data is to cause the additive manufacturing system to operate in accordance with the first set of operational parameters during the manufacturing of a first part of the partition and subsequently to operate in accordance with the second set of operational parameters during the manufacturing of a second part of the partition.

5. A method according to claim 1, wherein the intermediate print data is to cause the additive manufacturing system to manufacture a partition comprising at least one of:

a prism with a base of equal shape and size to the build surface; and a sealed container comprising at least one wall enclosing a volume, by solidifying build material to form the at least one wall of the container and leaving at least part of the build material in the enclosed volume unsolidified.

6. A method according to claim 1, further comprising:

receiving first print setting data identifying at least one print setting to be used to manufacture the first object; and receiving second print setting data identifying at least one print setting to be used to manufacture the second object;

wherein the first print data is generated from the first spatial data and the first print setting data, and the second print data is generated from the second spatial data and the second print setting data.

7. A method according to claim 6, wherein the first print setting data comprises a first build material identifier identifying a build material to be used in manufacturing the first object and the second print setting data comprises a second build material identifier identifying a build material to be used in manufacturing the second object.

8. A method according to claim 1, wherein each of the first build material and the second build material comprises a powder.

9. A method according to claim 1, wherein the intermediate print data is to cause the additive manufacturing system to manufacture a partition having an upper surface of equal shape and size and orientation to the build surface.

10. A method according to claim 1, further comprising:

generating first build material recycling data to cause the additive manufacturing system to, subsequent to the manufacturing of the partition, remove unsolidified first build material from a first part of the build chamber located beneath the partition, and generating second build material recycling data to cause the additive manufacturing system to, subsequent to the manufacturing of the partition, remove unsolidified second build material from a second part of the build chamber located above the partition.

11. A method according to claim 1, further comprising receiving third spatial data defining a third three-dimensional object; and:

generating, from the third spatial data, third print data to cause the additive manufacturing system to manufacture the third three-dimensional object at least partly from the first build material by depositing and selectively solidifying at least one layer of build material comprising the first build material, before manufacturing the partition; or generating, from the third spatial data, third print data to cause the additive manufacturing system to manufacture the third three-dimensional object at least partly from the second build material by depositing and selectively solidifying at least one layer of build material comprising the second build material, after manufacturing the partition.

12. A method according to claim 1, further comprising at least one of:

generating print data to cause the additive manufacturing system to deposit, and leave unsolidified, at least one layer of the first build material before manufacturing the first three-dimensional object;

generating print data to cause the additive manufacturing system to deposit, and leave unsolidified, at least one layer of the first build material between manufacturing the first three-dimensional object and manufacturing the partition; and generating print data to cause the additive manufacturing system to deposit, and leave unsolidified, at least one layer of the second build material between manufacturing the partition and manufacturing the second three-dimensional object.

13. A method according to claim 1, further comprising generating build material loading data to cause the additive manufacturing system to set a configuration of a build material container of the additive manufacturing system in accordance with at least one build material container parameter comprised in the build material loading data; wherein generating the build material loading data comprises calculating a volume of the first build material to be used in generating the plurality of 3D objects and calculating a volume of the second build material to be used in generating the plurality of 3D objects, and determining the at least one build material container parameter based on the calculated volume of the first build material and the calculated volume of the second build material.

14. A print data generation system to generate print data for use by an additive manufacturing system to generate a plurality of three-dimensional objects in a build chamber using plurality of powder build materials, the print data generation system comprising: an interface to:

receive first model data associated with a first three-dimensional object; and receive second model data associated with a second three-dimensional object; and a processor to:

generate, using the received first model data, first object print data to cause the additive manufacturing system to manufacture the first three-dimensional object from a first powder build material in the build chamber;

generate partition print data to cause the additive manufacturing system to manufacture a partition formed to separate a first lower part of the build chamber, containing the first three-dimensional object, from and a first upper part of the build chamber; and generate, using the received second model data, second object print data to cause the additive manufacturing system to manufacture the second three-dimensional object from a second powder build material in the first upper part of the build chamber.

15. A computer readable memory encoded with print data for use by an additive manufacturing system having a build chamber to generate a first three-dimensional object from a first build material and subsequently generate a second three-dimensional object from a second build material, the print data comprising instructions to cause the additive manufacturing system to:

manufacture a first three-dimensional object, by depositing and selectively solidifying in the build chamber at least one layer of build material, using a first set of operational parameters corresponding to the first build material;

manufacture a three-dimensional partition, by depositing and selectively solidifying in the build chamber at least one layer of build material, the partition including at least one layer which is fully solidified such that the partition bisects the build chamber into a first lower part of the build chamber, containing the first three-dimensional object, and a first upper part of the build chamber; and manufacture a second three-dimensional object in the first upper part of the build chamber, by depositing and selectively solidifying in the build chamber at least one layer of build material, using a second set of operational parameters corresponding to the second build material;

wherein the instructions cause the additive manufacturing system to:

manufacture the three-dimensional partition using the first set of operational parameters; or manufacture the three-dimensional partition using the second set of operational parameters; or manufacture a first part of the three-dimensional partition using the first set of operational parameters and subsequently manufacture a second part of the three-dimensional partition using the second set of operational parameters.

* * * * *